Nov. 15, 1932.      A. L. CUSHMAN      1,887,547
MOTOR DRIVE UNIT
Filed March 8, 1930
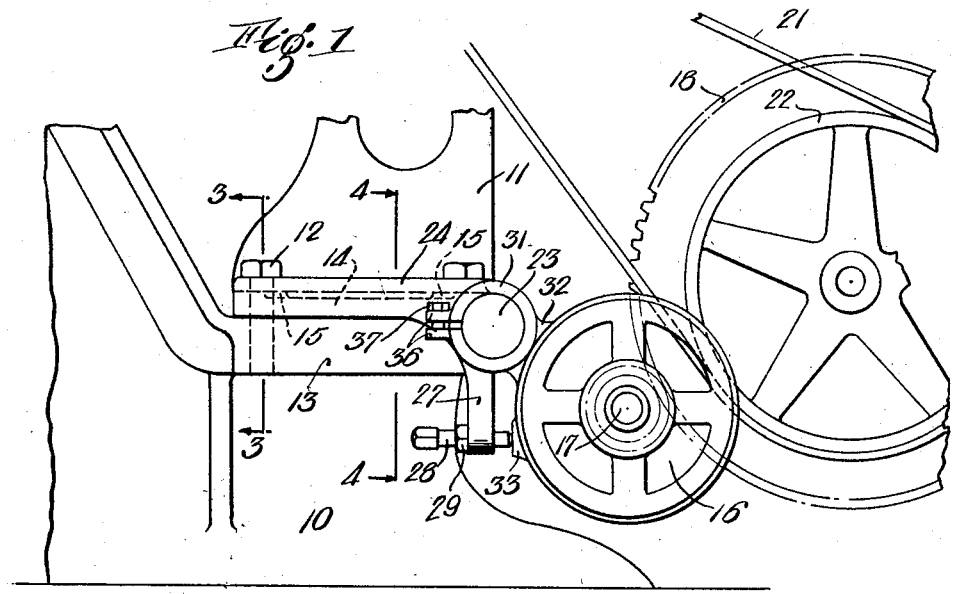
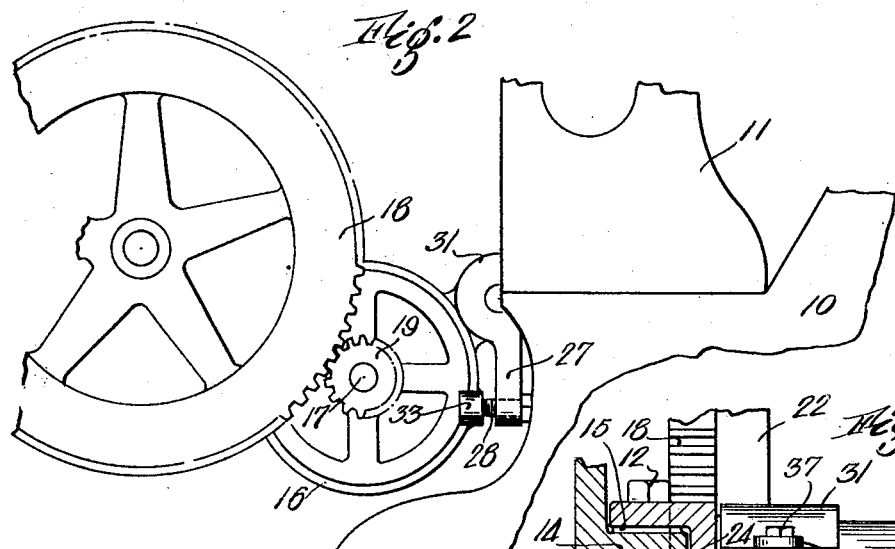
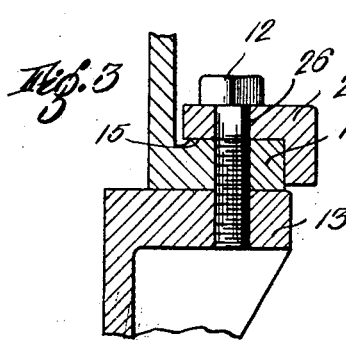

Patented Nov. 15, 1932

1,887,547

UNITED STATES PATENT OFFICE

ABE LINCOLN CUSHMAN, OF CONCORD, NEW HAMPSHIRE

MOTOR DRIVE UNIT

Application filed March 8, 1930. Serial No. 434,413.

This invention relates to means for supporting an individual motor drive unit for linotype or other machines.

Objects of this invention are to provide means for supporting an individual driving motor from the frame of the driven machine in such manner as to insure that the shaft of the motor and the shaft of the driven gear shall be in parallel relation one to the other, and to provide for the removal of the motor and the replacing of it upon its support without disturbing such parallel relation; also to provide novel means for adjusting the motor upon its support and for holding the motor in different adjusted position so as to bring the teeth of the motor pinion and the teeth of the driven gear into proper relation to give the most satisfactory service, and to provide means whereby the motor may be removed and replaced without disturbing such predetermined adjustment, and to permit the use of different sized driving pinions with the same driven gear.

In the drawing,

Fig. 1 is a side elevation of my motor support and motor applied to the frame of a linotype machine;

Fig. 2 is an elevation of the same parts shown in Fig. 1 viewed from the opposite side;

Fig. 3 is an enlarged section on the line 3—3 of Fig. 1; and

Fig. 4 is a section on the line 4—4 of Fig. 1.

In Figs. 1 and 2 the frame of a standard linotype machine is illustrated, comprising a base or pedestal 10 on which the column 11 rests. These parts are held in fixed relation by means of bolts 12 which connect the mating flanges 13 and 14 respectively of the base 10 and the column 11. These bolts extend through the bosses 15 on the upper flange 14 and the top surfaces of the bosses are usually machined to form leveled and finished bearing surfaces for the heads of the bolts.

A motor 16 drives the spur gear 18 which constitutes the main driving member of the linotype machine. The armature shaft 17 of the motor projects beyond one side of the motor casing and carries on its projecting part a driving pinion 19 adapted to mesh with the gear 18. Power is transmitted from the gear 18 by means of a belt 21 operating over a pulley 22 formed integral with the gear.

In accordance with the present invention the motor is supported from a journal 23 preferably in the form of a stub shaft carried by a bracket 24. As shown in Fig. 3 this bracket is adapted to rest upon the machined upper surfaces of the bosses 15 of the upper flange 14 of the pedestal 11 and is provided with holes 26 to receive the bolts 12 so that no additional structure or modification is required other than that of removing the bolts 12 to attach the bracket 24. The horizontal arm of this bracket is in the form of an angle to fit over the flange 14 to facilitate positioning these parts. An arm 27 depends from the end of the bracket below the journal 23 and an adjusting screw 28 is threaded through the lower end of this arm and provided with a lock nut 29 for holding the screw in desired positions. A journal bearing 31 in the form of a split sleeve is connected integrally to the casing 17 of the motor by the arm 32 so that the motor may pivot about the journal 23, the attachment preferably being such that the motor normally tends to move the driving pinion 19 out of engagement with the driven gear 18. Opposed lugs 36 are mounted on the bearing on opposite sides of the split and a bolt 37 extends through one of the lugs and has threaded engagement with the other, so that the bearing may be contracted about the journal to assist in holding the parts in any desired position. The motor may also be moved about the journal by adjustment of the adjusting screw 28 which engages an abutment arm 33 provided on the motor casing for this purpose.

It will be seen that the screw 28 may be adjusted so that the proper relation of the gears may be maintained to a nicety and also that driving pinions of different sizes may be used as desired.

I claim:

1. A motor drive unit comprising a motor having a casing and an armature shaft projecting beyond one side of the casing, a gear on the projecting part of the armature shaft for engagement with a gear to be driven, a supporting bracket having a horizontal arm for attachment to the frame of a machine and a depending arm, a bearing on the supporting bracket and a complementary bearing member carried by the motor casing for supporting the motor for pivotal adjustment on the supporting bracket, an abutment member carried by the motor casing and an adjusting screw carried by the depending arm of the bracket and cooperating with the abutment member to control the pivotal adjustment of the motor.

2. A motor drive unit comprising a motor having a casing and an armature shaft projecting beyond one side of the casing, a gear on the projecting part of the armature shaft for engagement with a gear to be driven, a supporting bracket having a horizontal arm for attachment to the frame of a machine and a depending arm, a stub shaft on the bracket at the junction of said arms, a sleeve carried by the motor casing and fitting over said stub shaft for supporting the motor for pivotal adjustment on the bracket, an abutment arm carried by the motor casing and an adjusting screw carried by the depending arm of the bracket and cooperating with the abutment arm to control the pivotal adjustment of the motor.

3. The combination with a machine having a fixed support and a driven gear, of a motor drive unit comprising a motor having a casing and an armature shaft projecting beyond one side of the casing, a gear on the projecting part of the armature shaft for engagement with said driven gear, a pivotal support for the motor, an arm projecting from one side of the motor casing and movable means carried by the fixed support and engageable with said arm for moving the motor about its pivotal support to vary the relation of said gears.

4. The combination with a machine comprising a driven gear and a frame comprising a base and a member resting on the base, said member having a flange and bolts extending through the flange for attaching the latter to the base, of an angle having its legs disposed against the top and edge portions of said flange and secured thereto by said bolts, a journal on said angle and arranged with its axis substantially parallel to that of the driven gear, a driving gear for engagement with the driven gear, a motor for operating the driving gear, means for supporting the motor and the driving gear from said journal, and means for holding the motor and the driving gear in fixed positions with reference to said journal.

5. The combination as set forth in claim 4, and an arm depending from said angle, and means carried by said arm for moving the motor about the journal.

Signed by me at Concord, New Hampshire, this 28th day of February, 1930.

ABE LINCOLN CUSHMAN.